United States Patent [19]
Boyd et al.

[11] Patent Number: 5,472,110
[45] Date of Patent: Dec. 5, 1995

[54] STORAGE CONTAINER FOR TOOLS

[75] Inventors: Edward L. Boyd, Wooster, Ohio; Nai-Cheng Tsao, Arkansas City, Kans.

[73] Assignee: Rubbermaid Incorporated, Wooster, Ohio

[21] Appl. No.: 212,391

[22] Filed: Mar. 10, 1994

Related U.S. Application Data

[63] Continuation of Ser. No. 929,102, Aug. 13, 1992, abandoned.

[51] Int. Cl.⁶ .......................... B65D 45/22; B65D 25/10
[52] U.S. Cl. ...................... 220/326; 220/533; 206/373
[58] Field of Search ...................... 220/326, 324, 220/343, 342, 751, 532, 533, 554; 206/373, 372, 499, 514, 486, 563, 562, 443; 292/DIG. 38, 205, 204, 104, 286; 211/70.6, 74, 60.1

[56] References Cited

U.S. PATENT DOCUMENTS

| | | | |
|---|---|---|---|
| D. 161,771 | 1/1951 | Lumley | 220/554 |
| D. 296,497 | 7/1988 | Kime | D3/73 |
| 2,139,293 | 12/1938 | Wallgren | 144/285 |
| 2,611,479 | 9/1952 | Oliver | 206/16 |
| 2,880,918 | 4/1959 | Schweikhard | 223/107 |
| 3,014,759 | 12/1961 | Bing | 297/191 |
| 3,092,428 | 6/1963 | Kerschner | 312/218 |
| 3,126,120 | 3/1964 | Crate | 220/343 |
| 3,165,247 | 1/1965 | Burns | 224/29 |
| 3,171,566 | 3/1965 | Mitchell | 220/343 X |
| 3,259,230 | 7/1966 | Jaeger | 206/16 |
| 3,709,429 | 1/1973 | McKenzie et al. | 211/74 |
| 3,825,110 | 7/1974 | Halbich et al. | 220/324 X |
| 4,303,158 | 12/1981 | Perkins | 206/373 |
| 4,314,651 | 2/1982 | Gaiser et al. | 220/326 |
| 4,344,646 | 8/1982 | Michel | 220/326 |
| 4,449,629 | 5/1984 | Barrieau | 206/45.19 |
| 4,522,312 | 6/1985 | Rathgeber et al. | 220/324 |
| 4,593,816 | 6/1986 | Langenbeck | 220/533 |

(List continued on next page.)

OTHER PUBLICATIONS

Contico Automotive, A Division of Contico International Inc., St. Louis, Mo. 63132, "Tuffcase" 2 page sell sheet, 1990.
Contico, St. Louis, Missouri 63132, 1 page sell sheet, 1990.
Contico, St. Louis, Missouri 63132, "Tuff Parts Organizer" 1 page sell sheet, 1990.
Contico Automotive, A Division of Contico International Inc., St. Louis, Mo. 63132, "Tuff-Shelf" 2 page sell sheet, 1990.
Creative Industries International, Inc., P.O. Box 767397, Atlanta, Ga. 30076, "Truck Stor Pak" 1 page sell sheet, 1988.
Rubbermaid Incorporated, Specialty Products Division, Wooster, Ohio 44691–6000, "Storage Containers" 1 page sell sheet, 1992.

Primary Examiner—Stephen J. Castellano
Attorney, Agent, or Firm—Renner, Kenner, Greive, Bobak, Taylor & Weber

[57] ABSTRACT

A storage container (10) includes a front cover (11) and a back base portion (12) connected at the bottom thereof by a hinge assembly (13) and at the top thereof by a latch assembly (14). The latch assembly (14) includes a latch body (55) pivotally attached to the base portion (12) and engaging the cover (11) which carries a tongue (72) having a safety catch (73) at the end thereof which extends through a slot (71) in the latch body (55) to engage the same. The hinge assembly (13) includes spaced hook members (49) which have an opening (50) therein to receive axles (52) carried between spacers (51). A tray (33) is also provided for the container (10) which has a bottom support surface (34) to hold items thereon and it also includes apertures (38) to hold other items. In addition, flanges (41, 42) which are formed with rib members (40) which depend from the support surface (34) are also provided to hold items in container (10). The tray (33) can be selectively positioned at several locations by sliding rails (45) formed therein into tracks (43) formed in the base portion (12).

14 Claims, 6 Drawing Sheets

U.S. PATENT DOCUMENTS

| | | | |
|---|---|---|---|
| 4,602,715 | 7/1986 | Sarver et al. | 220/533 |
| 4,631,783 | 12/1986 | Hayashi | 211/70.6 X |
| 4,651,873 | 3/1987 | Stolcenberg et al. | 206/486 X |
| 4,714,158 | 12/1987 | Oltman et al. | 206/373 X |
| 4,779,752 | 10/1988 | Vallee et al. | 220/533 |
| 4,793,508 | 12/1988 | Thompson | 220/533 |
| 4,819,800 | 4/1989 | Wilson | 206/373 |
| 4,832,193 | 5/1989 | Kime | 206/372 |
| 4,846,346 | 7/1989 | Kime | 206/372 |
| 4,850,484 | 7/1989 | Denman | 211/74 X |
| 4,884,689 | 12/1989 | Su-Chin | 220/533 |
| 4,905,949 | 3/1990 | Cosgrove | 211/74 X |
| 4,984,687 | 1/1991 | Hanna et al. | 206/373 |
| 5,036,975 | 8/1991 | Chow | 206/376 |
| 5,040,834 | 8/1991 | Kahl et al. | 220/324 X |
| 5,076,437 | 12/1991 | Schindler | 220/554 |
| 5,078,297 | 1/1992 | Howard et al. | 220/533 |
| 5,253,756 | 10/1993 | Goekler | 220/533 |
| 5,271,520 | 12/1993 | McAfee | 220/554 |

STORAGE CONTAINER FOR TOOLS

This application is a File Wrapper Continuation of U.S. Ser. No. 07/929,102, filed Aug. 13, 1992, now abandoned.

TECHNICAL FIELD

This invention relates to a storage container, such as for holding tools and the like, which is particularly suited for the automotive field. More specifically, this invention relates to a storage container which is of a profile such that it can readily be positioned behind the seats of vehicles such as pick-up trucks.

BACKGROUND ART

Drivers of vehicles such as pick-up trucks often need to store articles such as tools or the like nearby in the cab of the vehicle. As such, the only convenient place is the rather confined area behind the seat of the vehicle. However, merely locating the tools or other items randomly behind the seat deters from the convenient retrieval thereof. Some vehicles have been provided with pouches affixed to the back of the seat to hold the articles. While at least adequately holding the articles, such pouches still do not provide an organized storing of the items and, in addition, the pouches are not susceptible to being removed from the vehicle and used as a carrying case.

As a result, carrying cases have been designed with a rather slim profile so that they can readily be positioned behind the seat of the vehicle and removed therefrom when it is desired to transport the contents of the case away from the vehicle. Most all of these cases are provided with a separate handle and separate latches, and some are optionally provided with a separate locking mechanism.

Recently an all-purpose storage container has been developed with a combined latch, handle, and lock area at each end thereof. Such is shown, for example, in U.S. Pat. No. 5,040,834. There, each of the latches are lockable and double as handles for transporting the container. While such a latch would be suitable for storage containers of a slimmer profile, since only one such latch would be logically employed, it might have a tendency to open when being used as the single handle on the unit, a problem which does not exist with the latching mechanism of the aforementioned patent where both latches are intended to be gripped to transport the container.

The slim profile carrying cases currently available do not readily provide the user with optional storage configurations; that is, they are usually provided with permanently located drawers, shelves and the like suitable for only specific usages or storage capabilities. Moreover, these products can only be used to store or carry articles and are not susceptible to be readily hung on a wall when not in use, nor are they susceptible to being employed as a tray to hold articles currently being used, such as when the vehicle owner is working on the engine of the vehicle.

Thus, the need exists for a storage container having a profile adapted to be stored behind the seat of a vehicle, such as a pick-up truck, which is versatile, and which advantageously combines the handle, latch and lock features within the slim profile.

DISCLOSURE OF THE INVENTION

It is thus a primary object of the present invention to provide a portable storage container of a profile such that it can readily be located behind the seat of a vehicle such as a pick-up truck.

It is another object of the present invention to provide a storage container, as above, which has a handle in the form of a lockable latch which will not open when the container is being carried.

It is a further object of the present invention to provide a storage container, as above, with at least one removable shelf which can be positioned at a plurality of locations within the container, as desired by the user.

It is an additional object of the present invention to provide a storage container, as above, in which the front cover is removably, hingedly attached to the rear base so that the base may be used without the cover as a tray.

It is yet another object of the present invention to provide a storage container, as above, which can readily be positioned on the wall behind the seat of the vehicle, if desired, or on a wall when not being used.

These and other objects of the present invention, as well as the advantages thereof over existing prior art forms, which will become apparent from the description to follow, are accomplished by the improvements hereinafter described and claimed.

In general, a storage container made in accordance with the present invention includes a base portion, a cover portion and a latch assembly. The latch assembly includes a body member pivotally connected to one of the portions and engageable with the other portion. The other portion also includes a member which will engage the latch body when in the latched position.

In accordance with another aspect of the invention, the cover portion and base portion are removably attached to each other by a hinge assembly which includes a hook member having an opening therein carried on one of the portions and an axle assembly carried on the other portion. The axle assembly is received by the hook member through its opening, and the hook member rotates on the axle assembly when the container is being opened and closed.

Another aspect of the present invention relates to a tray which can be selectively positioned on the base portion by means of a plurality of tracks formed in the base portion to selectively receive rail members formed on the tray. The tray is also novel in that it not only includes a support surface to hold items, but also it can carry items not positioned on the support surface.

A preferred exemplary storage container incorporating the concepts of the present invention is shown by way of example in the accompanying drawings without attempting to show all the various forms in which the invention might be embodied, the invention being measured by the appended claims and not by the details of the specification.

PREFERRED EMBODIMENT FOR CARRYING OUT THE INVENTION

A storage container made in accordance with the concepts of the present invention is indicated generally by the numeral 10 and includes a front cover indicated generally by the numeral 11 and a back base portion indicated generally by the numeral 12. The lower end of cover 11 is removably attached to the lower end of base portion 12 by a hinge assembly generally indicated by the numeral 13, and the upper end of cover 11 is releasably attached to the upper end of base portion 12 by a latch assembly generally indicated by the numeral 14. Front cover 11 and back base portion 12 can be made of any suitable material, preferably polypropylene.

Front cover 11 includes a generally planar lower front surface 15 which could be ornamentally adorned, if desired, and which could extend all the way to the top of container 10 without departing from the concept of the present invention. However, the top of lower front surface 15 tapers inwardly, as at 16, and then turns upwardly forming an upper front surface 17. Cover side walls 18 extend from the edges of lower front surface 15 and upper front surface 17 toward back base portion 12. Similarly, a top cover wall 19 extends toward back base portion 12 from the top of upper front surface 17. A peripheral lip 20 extends around the entire periphery of cover side walls 18 and top cover wall 19.

Figure 1:
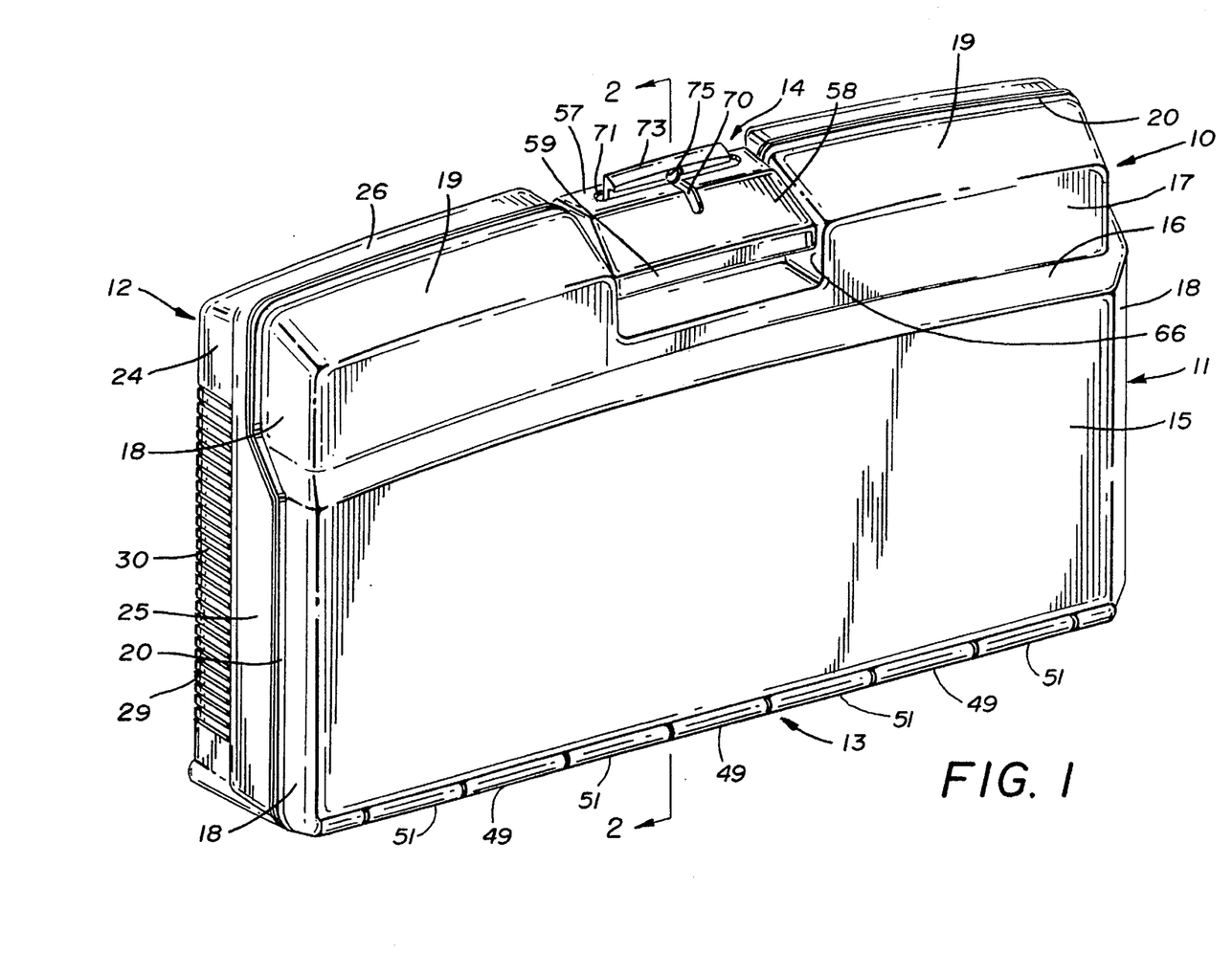
FIG. 1 is a perspective view of a storage container made in accordance with the concepts of the present invention.
Figure 2:
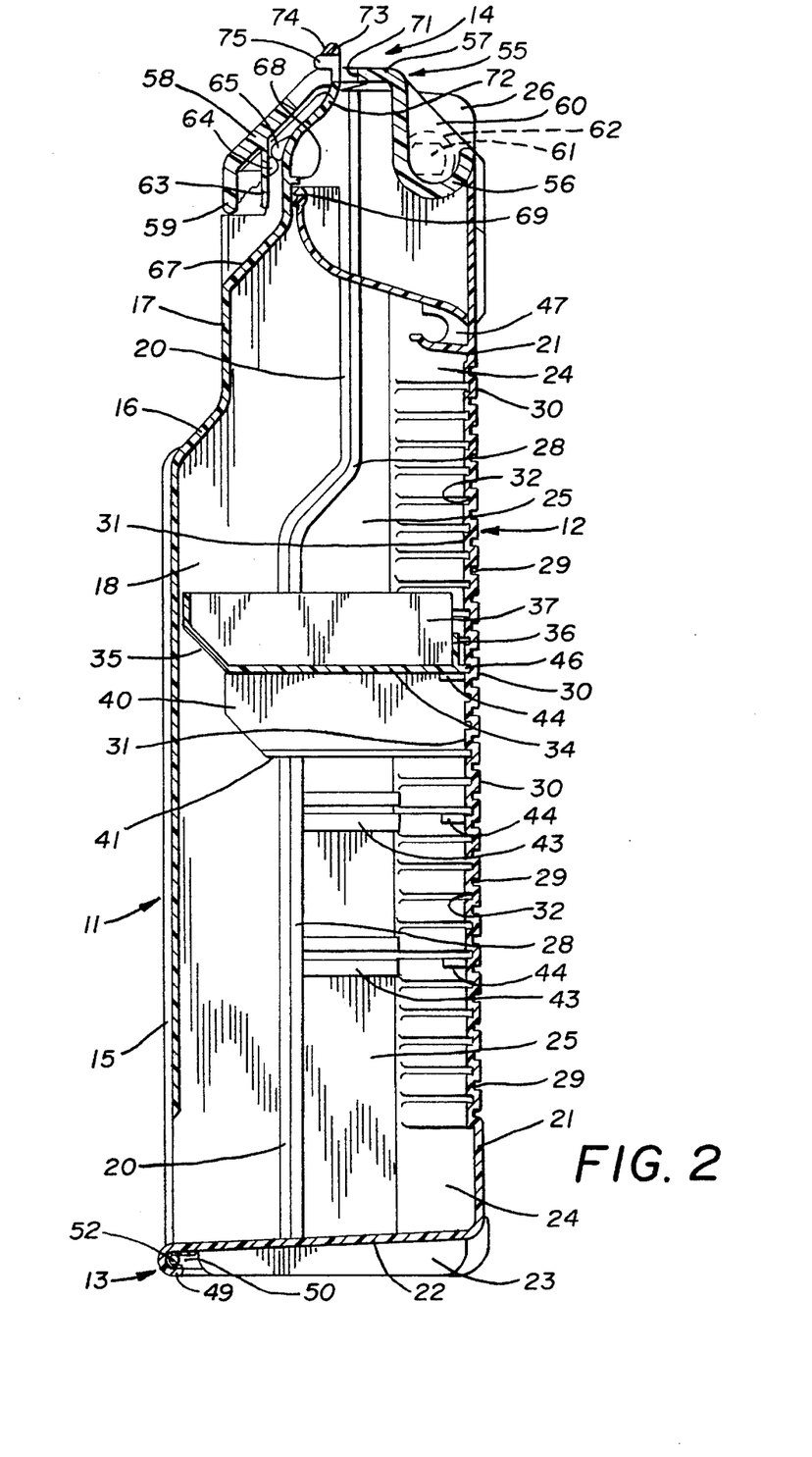
FIG. 2 is a sectional view taken substantially along line 2—2 of FIG. 1.

Back base portion 12 includes a back wall 21 and a floor or bottom surface 22 extending generally laterally therefrom toward front cover 11. Bottom surface 22 forms the bottom of container 10 and has a plurality of spaced rib-like feet 23 (FIG. 2) depending therefrom upon which container 10 rests when in its vertical position such as shown in FIGS. 1 and 2. Extending from the edges of back wall 21 and toward front cover 11 are base portion stepped side walls which include inner side walls 24 and outer side walls 25 stepped outwardly from inner side walls 24. Similarly, a top wall 26 extends toward front cover 11 from the top of back wall 21, with the stepped side walls 24 and 25 blending into top wall 26. The inner edge of outer side walls 25 tapers, as at 27, to form a surface complementary to the taper 16 between lower front surface 15 and upper front surface 17 of front cover 11. A peripheral lip 28 extends around the entire periphery of outer side walls 25 and top wall 26 and is adapted to contact lip 20 of cover 11 when container 10 is closed.

Back wall 21 is provided with a plurality of spaced external slots 29 thereby defining external ribs 30 therebetween. Each slot 29 also defines a corresponding internal rib 31, with each rib 30 defining a corresponding internal slot 32. Slots 29 and ribs 30 can, as shown, extend around to inner side walls 24, and not only provide strength to container 10 as well as an aesthetic adornment, but also the corresponding internal ribs 31 and slots 32 cooperate to hold an internal shelf or tray, generally indicated by the numeral 33, in a manner now to be described.

Figure 5:
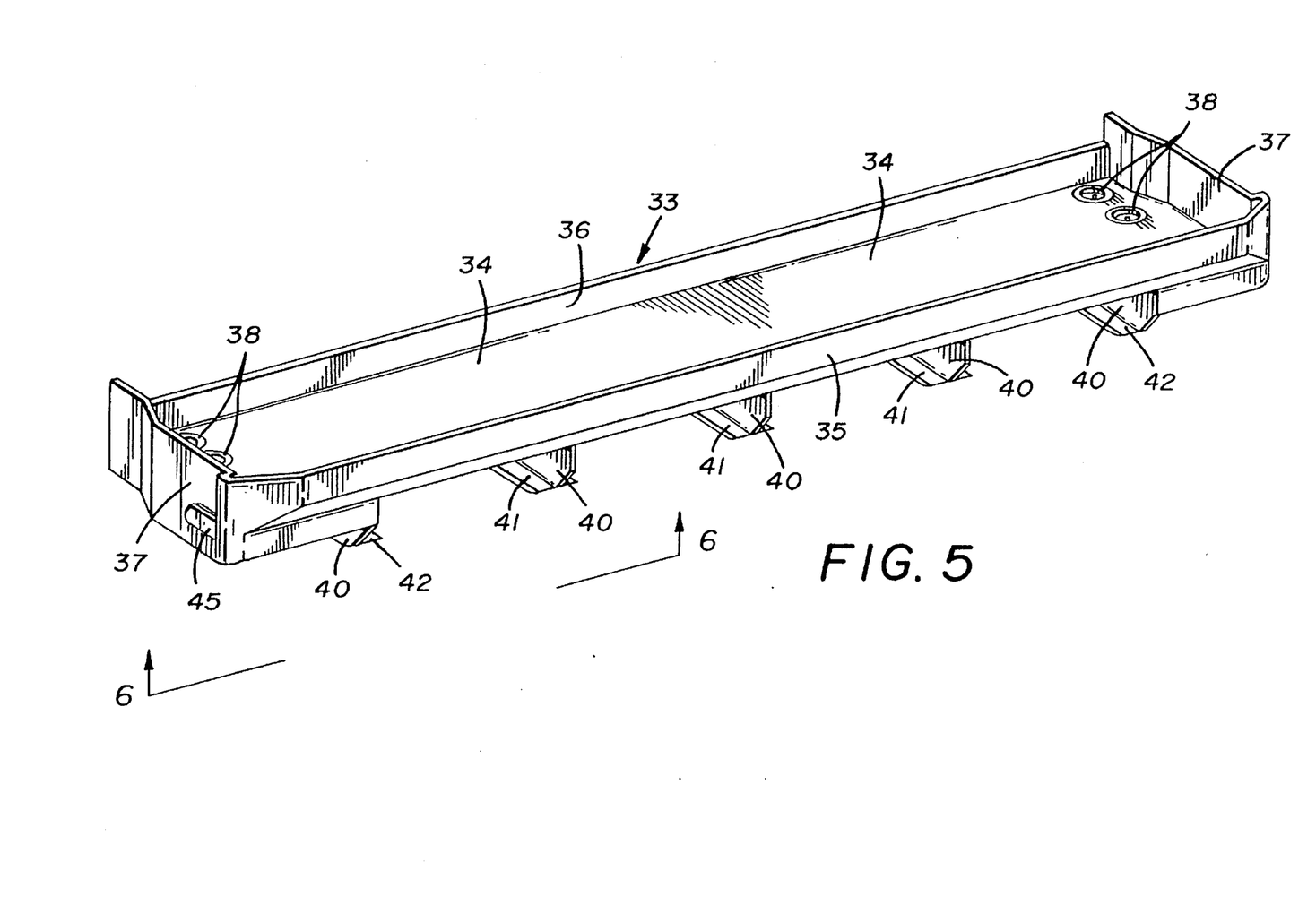
FIG. 5 is a perspective view of the removable tray for the container.
Figure 6:
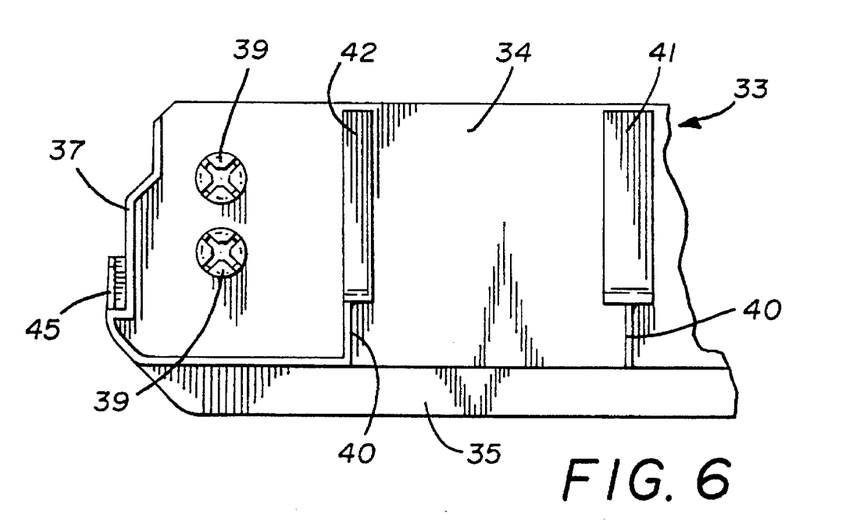
FIG. 6 is a fragmented bottom view of the tray taken substantially along line 6—6 of FIG. 5.

As best shown in FIG. 5, tray 33 includes a bottom item supporting surface 34, a front wall 35 and a rear wall 36 extending upwardly from bottom surface 34, and side walls 37 interconnecting walls 35 and 36. As such, tray 33 can confine tools or the like as desired by the user. Not only can such articles be placed directly on bottom surface 34, but also bottom surface 34 is shown as having apertures 38 extending therethrough which are specifically adapted to hold items such as screwdrivers or the like. Axially split tubular members 39 (FIG. 6) can be formed on the underside of bottom surface 34 concentric with apertures 38 to snugly hold screwdrivers as they are pushed through apertures 38 and thereby radially spread tubular members 39.

Other items can also be conveniently held by tray 33. To this end, a plurality of spaced rib members 40 depend from the bottom surface 34 of tray 33. A T-flange 41 is provided at the lower end of the center three rib members 40 and an L-flange 42 is provided at the lower end of the outer two rib members 40. Rib members 40 are spaced to receive many conventional container products, with the upper flanges of such products being held in place by adjacent flanges 41 and/or adjacent flanges 41 and 42. Specifically, rib members 40 and their associated flanges 41, 42 are preferably spaced so as to receive upper rims of containers such as those sold by Rubbermaid Incorporated of Wooster, Ohio under the trademark SERVIN' SAVER. Thus, the upper rim of such or like containers can be slid onto adjacent flanges 41 and/or adjacent flanges 41 and 42, and the tray 33 shown can thereby carry up to four such containers for holding items such as screws, nails or the like.

Tray 33 is selectably positionable at a variety of locations within container 10. To that end, a plurality of T-slots or tracks 43 (three shown) are formed on the inside of side walls 25. Each slot 43 formed on one side wall 25 is aligned with an equivalent slot 43 on the opposite side wall 25. Three opposed pairs of slots 43 are thus shown, although it is to be understood that more than three pairs or less than three pairs could be provided depending on the desired number of optional locations for tray 33. Each pair of aligned T-slots 43 is preferably also aligned with a slot 32 internally of back wall 21. In addition, just below the slots 32 which are aligned with each pair of T-slots, support tabs 44 extend inwardly from back wall 21.

Each T-slot 43 is adapted to receive a T-shaped rail 45 positioned on the outside of each tray side wall 37 near the front thereof. As such, tray 33 can be positioned within container 10 at any location of aligned T-slots 43 by merely sliding rails 45 within slots 43. When completely inserted as shown in FIG. 2, tabs 44 provide additional support for the bottom surface 34 of tray 33. In addition, a rib 46 which extends rearwardly from rear wall 36 along the entire length thereof is received in the slot 32 which is aligned with the pair of T-slots 43 being utilized to provide additional support for tray 33. Thus, dependent on the size of items intended to be stored on tray 33 or dependent on the size of containers carried by flanges 41, 42 below tray 33, tray 33 may be selectively positioned at an appropriate location in container 10.

Container 10 may be provided with other convenient item storage features. For example, one or more pairs of clips 47 may be positioned on the inside of back wall 21 to receive and hold tubular items such as a tire gauge, pencil or the like. In addition, if it is desired to hang container 10, for example on a peg board wall or on the back wall of the cab of a pick-up truck, slot apertures 48 can be provided through back wall 31 to receive a peg or fastener therethrough for that purpose.

Figure 4:
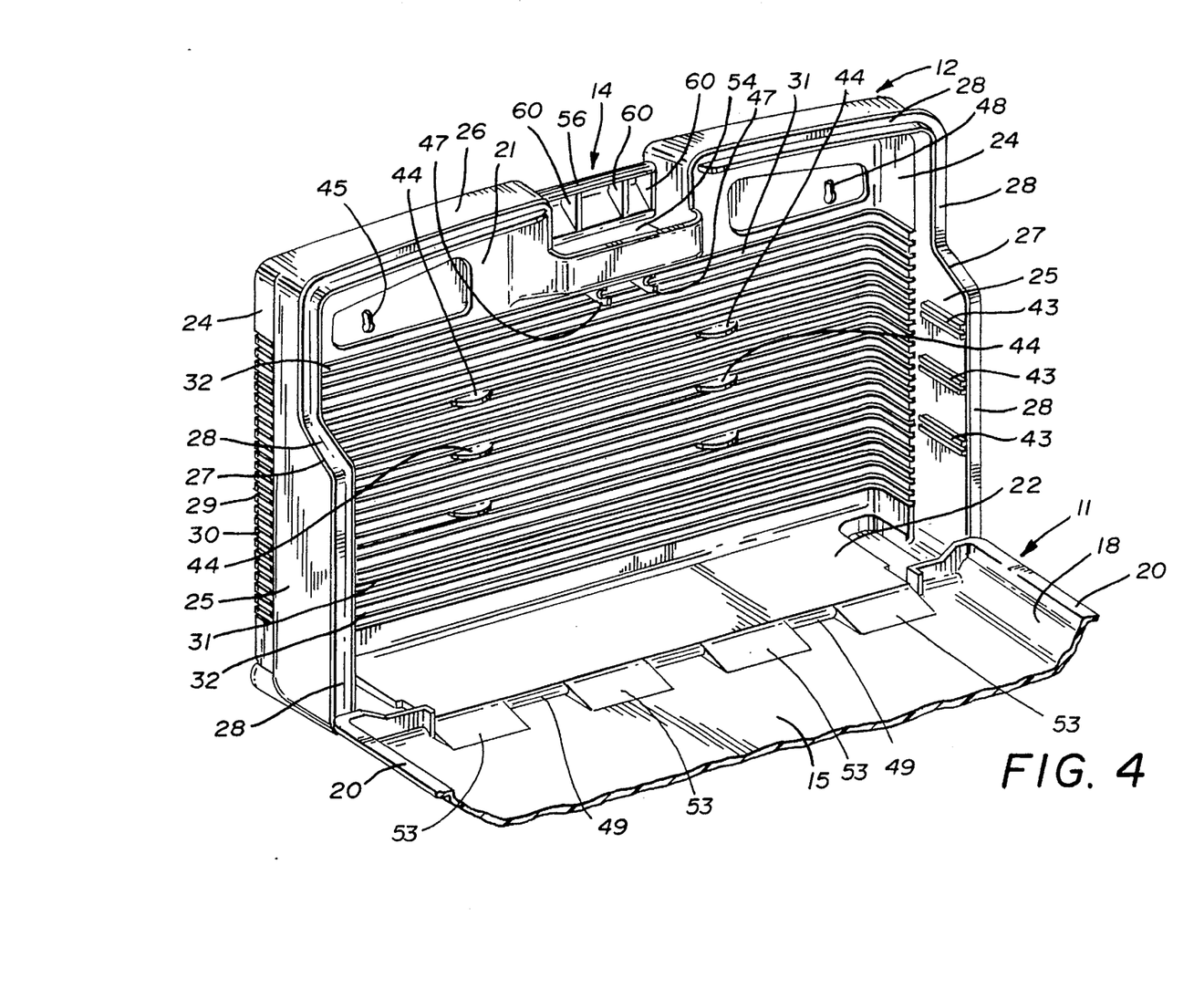
FIG. 4 is a fragmented perspective view of the container in an open position and without its internal tray.

Hinge assembly 13 which pivotally connects front cover 11 to back base portion 12 is probably best seen in FIGS. 2 and 4. The end of bottom surface 22 of base portion 12 adjacent to cover 11 is formed with a plurality of spaced hook members 49 therein. As shown in FIG. 2, hook members 49 turn downwardly from bottom surface 22, back toward back wall 21, and are rearwardly open, as at 50, leaving a space between each hook member 49 and feet 23.

Hinge assembly 13 also includes a plurality of spacers 51 which are formed on the bottom of lower front surface 15 of cover 11. An axle 52 (FIG. 2) extends between each spacer 51, and ribs 53 provide structural support for each spacer 51. As shown in FIG. 4, spacers 51 alternate with hook members 49, with hinge assembly 13 being assembled by positioning hook members 49 over the exposed axles 52 between each spacer 51. When cover 11 is rotated away from base portion 12, as to the left in FIG. 2, axles 52 rotate within hook members 49. If desired, when container 10 is in the fully open position, hinge assembly 13 can be disassembled by simply moving axles 52 through the opening 50 in hook members 49 and thereafter lowering them through the space between hook members 49 and feet 23. The option of being able to thereby remove cover 11 from base portion 12 is advantageous if, for example, the user desires to use base portion 12 in a horizontal position as an open tray or if, for example, the user desires to have an open container when base portion 12 is hung on a wall as previously described. Thus, in effect, base portion 12 can be converted to an open tray or an open wall cabinet, if desired.

The latch assembly 14 by which cover 11 can be attached and locked to base portion 12 when in the closed position is best shown in FIGS. 1, 3, 4 and 7. Latch assembly 14 is similar to, but represents an improvement of, the latch assembly shown in U.S. Pat. No. 5,040,834 to which reference is made for whatever details may be necessary for a full understanding of latch assembly 14.

Latch assembly 14 is shown as being positioned in a recess 54 formed in top wall 26 of base portion 12, and includes a somewhat C-shaped body portion generally indicated by the numeral 55. As viewed in FIG. 7, latch body portion 55 includes an arcuate pivot section 56 adjoined by a generally horizontal central portion 57 which turns downwardly to form a bevelled portion 58 having a lug portion 59 at the end thereof.

Support flanges 60 (FIG. 4) extend between pivot section 56 and central portion 57. The outer of flanges 60 carry axle hubs 61 which extend through a recess in body portion 12 adjacent thereto. Therefore axle hubs 61 extend internally within body portion 12 and receive a lock bushing 62 (FIGS. 2 and 7) thereon to axially hold axle hubs 61 relative to body portion 12. Latch body portion 55 can thus be rotated on axle hubs 61 from the open position shown in FIGS. 3 and 4 to the closed position shown in FIGS. 1 and 7 and vice versa. It should be noted that when in the closed position, latch assembly 14 doubles as a handle for container 10 as one merely needs to grasp underneath pivot portion 56 at the area within recess 54 to conveniently lift and transport container 10.

Figure 3:
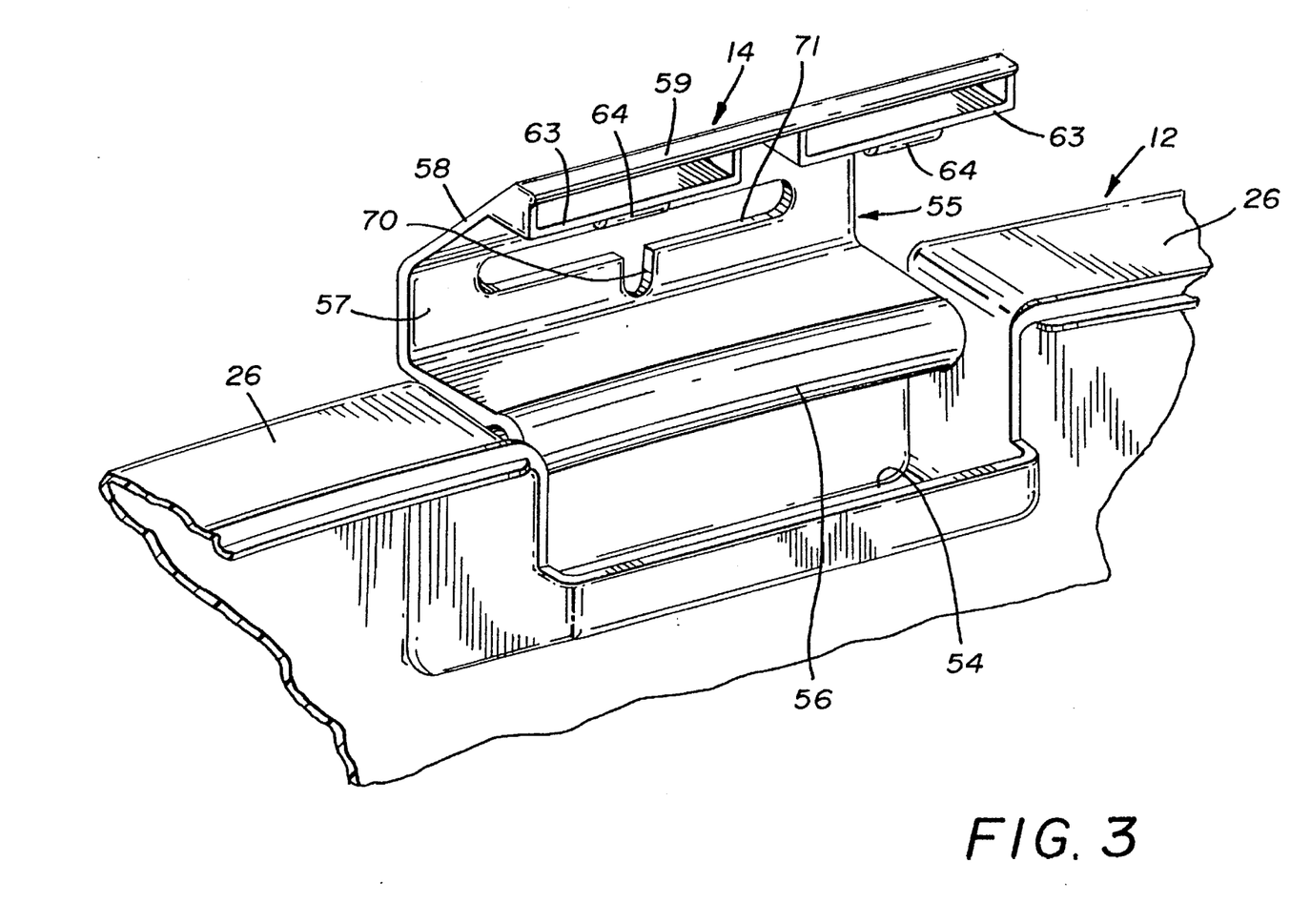
FIG. 3 is an enlarged fragmented perspective view of the latch mechanism of the container in an open position.
Figure 7:
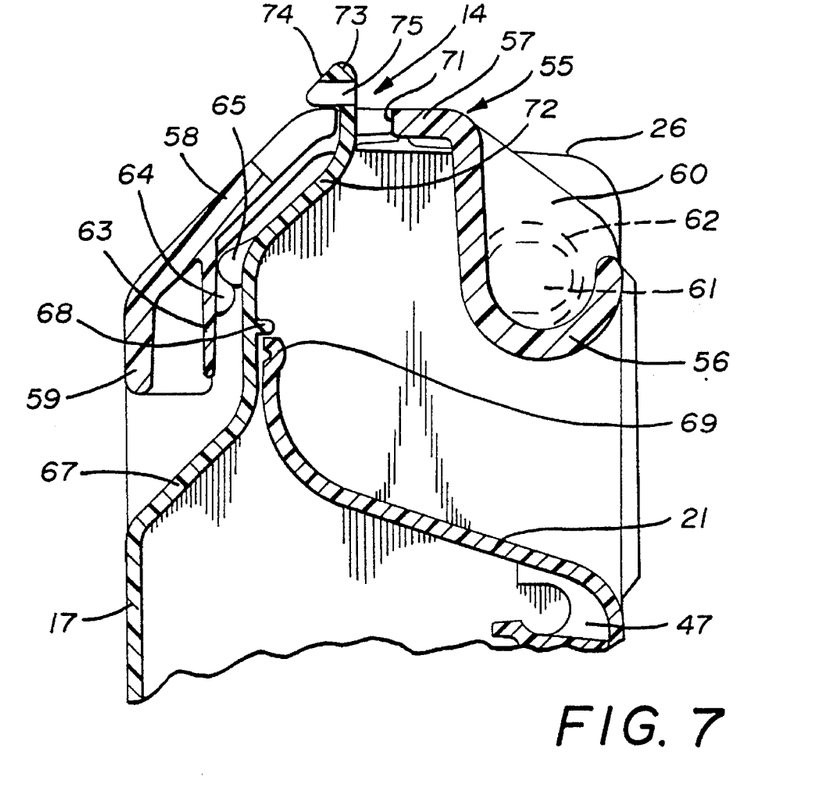
FIG. 7 is an enlarged fragmented sectional view of the portion of the view of FIG. 2 showing the latch area.

As shown in FIGS. 3 and 7, lug portion 59 of latch body 55 is provided with two, spaced, internally projecting U-shaped brackets 63, each of which carries a lug 64. Lugs 64 are adapted to engage protuberances 65 (FIG. 7) which extend from cover 11 into a recess 66 (FIG. 1) formed in top wall 19 thereof. As such, when latch body 55 is moved from the open position to the closed position, lugs 64 snap over and frictionally engage protuberances 65 to maintain front cover 11 on body portion 12. As shown in FIG. 7, upper front surface 17 of cover 11 turns inwardly, as at 67, and a rib 68 will engage a stop surface 69 at the top of back wall 21 of base portion 12 when in the latched position, Latch portions 57 and 58 are provided with a slot 70 therethrough and portion 57 is provided with an elongated cross slot 71 extending therethrough and laterally disposed with respect to slot 70. A resilient tongue 72 is formed at the top of upper front surface 17 of cover 11, this is, above inwardly turned surface 67, and when latch body 55 is in the closed position, tongue 72 is adapted to extend through cross slot 71. The end of tongue 72 is formed with a safety catch or barb 73 having an angled surface 74 and an aperture 75 therethrough. As latch body 55 is being closed, angled surface 74 will ride against the edge of cross slot 71 thereby depressing tongue 72 to the right in FIG. 7 until such time that barb 73 passes through cross slot 71 at which time it will snap to the left and engage latch body 55. Tongue 72 and its barb 73 thus prevents the latch from accidentally opening which could occur as, for example, when the latch is being used as a handle to carry container 10. To open latch assembly 14, one need only grasp and lift lug portion 59 with his fingers while at the same time pushing barb 73 (to the right in FIG. 7) with his thumb which thereby flexes tongue 72 and permits it to pass through cross slot 71. Should a more permanent locking of latch assembly 14 be desired, a conventional padlock can be positioned through aperture 75 of tongue 72 to thereby secure the contents of container 10.

It should thus be appreciated that a container constructed in accordance with the concepts of the present invention, as described herein, accomplishes the objects of the invention and otherwise substantially improves the art.

We claim:

1. A storage container comprising a base portion; a cover portion pivotally connected to a wall of said base portion for closing said base portion; and a latch assembly for attaching said cover portion to an opposed wall of said base portion; said latch assembly including a body member pivotally connected to one of said portions and engageable with the other of said portions, an aperture in said body member, a resilient member carrying a barb member near an end thereof, said barb member passing through said aperture to engage said body member when said body member is engaging said other of said portions, said barb member having an angled surface to facilitate the passage through said aperture, and an aperture through said resilient member to receive a padlock to lock said base portion to said cover portion.

2. A storage container according to claim 1 further comprising lugs formed near one end of said body member, said lugs engaging protuberances carried by said other of said portions.

3. A storage container according to claim 1 wherein said body member includes a pivot section which carries axle hubs received by said one of said portions, said pivot section serving as a handle for the container.

4. A storage container according to claim 1 further comprising a tray to carry items to be stored in the container, said tray having a support surface so that items can be positioned on said support surface, said support surface including means to hold items other than those positioned on said support surface.

5. A storage container according to claim 4 further comprising means to selectively position said tray on said base portion, said means to selectively position including a plurality of tracks formed on said base portion and rails formed on said tray, said rails being received by selected of said tracks so that said tray may be selectively positioned on said base portion.

6. A storage container according to claim 1 wherein the pivotal connection of said cover portion to said base portion is effected by a hinge member, said hinge member including a hook member carried by said one of said portions, said hook member having an open portion, and an axle carried by said other of said portions, said axle being positioned through said open portion into said hook member, said hook member rotating on said axle when said cover portion is pivoted relative to said base portion.

7. A storage container according to claim 6 further comprising a tray to carry items to be stored in the container, said tray having a support surface so that items can be positioned on said support surface, said support surface including means to hold items other than those positioned on said support surface.

8. A storage container according to claim 6 further comprising a tray to carry items to be stored in the container and means to selectively position said tray on said base portion, said means to selectively position including a plurality of track means formed on said base portion and rail means formed on said tray, said rail means being received by selected of said track means so that said tray may be selectively positioned on said base portion.

9. A storage container according to claim 1 further comprising a tray to carry items to be stored in the container and means to selectively position said tray on said base portion, said means to selectively position including a plurality of tracks formed on said base portion and rails formed on said tray, said rails being received by selected of said tracks so that said tray may be selectively positioned on said base portion.

10. A storage container comprising a base portion; a cover portion pivotally attached to said base portion for closing said base portion; and a tray to carry items to be stored in the container; said tray having a support surface so that items can be positioned on said support surface, said support surface including means to hold items other than those positioned on said support surface, said means to hold including a plurality of laterally spaced flange members depending from the bottom of said support surface, spaces being formed between every two adjacent flange members, each set of said two adjacent flange members being adapted to hold items in the space therebetween.

11. A storage container according to claim 10 wherein said means to hold further includes at least one aperture extending through said support surface to permit an item to pass therethrough and gripping means aligned with said at least one aperture to engage the item passing therethrough.

12. A storage container according to claim 10 further comprising means to selectively position said tray on said base portion, said means to selectively position including a plurality of tracks formed on said base portion and rails formed on said tray, said rails being received by selected of said tracks so that said tray may be selectively positioned on said base portion.

13. A storage container according to claim 12 wherein the pivotal attachment of said cover portion to said base portion is effected by a hinge member, said hinge member including a hook member carried by one of said portions, said hook member having an open portion, and an axle carried by the other of said portions, said axle being positioned through said open portion into said hook member, said hook member rotating on said axle when said cover portion is pivoted relative to said base portion.

14. A storage container according to claim 10 wherein the pivotal attachment of said cover portion to said base portion is effected by a hinge member, said hinge member including a hook member carried by one of said portions, said hook member having an open portion, and an axle carried by the other of said portions, said axle being positioned through said open portion into said hook member, said hook member rotating on said axle when said cover portion is pivoted relative to said base portion.

* * * * *

UNITED STATES PATENT AND TRADEMARK OFFICE
CERTIFICATE OF CORRECTION

PATENT NO. :   5,472,110
DATED      :   December 5, 1995
INVENTOR(S):   Boyd et al.

It is certified that error appears in the above-identified patent and that said Letters Patent is hereby corrected as shown below:

Claim 8, column 7, line 16, the words "track means" should be "tracks".

Claim 8, column 7, line 16, the words "rail means" should be "rails".

Claim 8, column 7, line 17, the words "rail means" should be "rails".

Claim 8, column 7, line 18, the words "track means" should be "tracks"

Signed and Sealed this

Fourteenth Day of May, 1996

Attest:

BRUCE LEHMAN

Attesting Officer                 Commissioner of Patents and Trademarks